United States Patent
Wah et al.

(10) Patent No.: US 9,473,644 B2
(45) Date of Patent: Oct. 18, 2016

(54) METHODS, SYSTEMS, AND COMPUTER PROGRAM PRODUCTS FOR HAIRPIN CONDITION ELIMINATION IN A TELECOMMUNICATIONS NETWORK

(75) Inventors: Allen Wah, Plano, TX (US); Phil Chiu, Plano, TX (US)

(73) Assignee: GENBAND US LLC, Plano, TX (US)

( * ) Notice: Subject to any disclaimer, the term of this patent is extended or adjusted under 35 U.S.C. 154(b) by 1615 days.

(21) Appl. No.: 11/544,467

(22) Filed: Oct. 6, 2006

(65) Prior Publication Data

US 2008/0037430 A1 Feb. 14, 2008

Related U.S. Application Data

(60) Provisional application No. 60/837,595, filed on Aug. 11, 2006.

(51) Int. Cl.
*H04M 7/12* (2006.01)
*H04L 29/06* (2006.01)
(Continued)

(52) U.S. Cl.
CPC .......... *H04M 7/123* (2013.01); *H04L 65/1043* (2013.01); *H04L 65/1083* (2013.01);
(Continued)

(58) Field of Classification Search
CPC . H04L 12/66; H04L 65/1006; H04L 65/605; H04L 65/102; H04L 65/1043; H04L 65/1083; H04L 65/80; H04W 65/102; H04W 65/1083; H04M 3/54; H04M 7/127; H04M 15/56; H04M 7/123; H04M 7/125; H04Q 11/0005
USPC ........ 307/216–220, 241, 244, 250, 260–263, 307/352–356; 379/219, 229, 242; 370/216–220, 241, 244, 250, 260–263, 370/352–356
See application file for complete search history.

(56) References Cited

U.S. PATENT DOCUMENTS

| 5,970,134 A | 10/1999 | Highland et al. |
| 6,198,558 B1 * | 3/2001 | Graves ............... H04Q 11/0062 370/241.1 |

(Continued)

FOREIGN PATENT DOCUMENTS

| WO | WO 2005/091588 A1 | 9/2005 |
| WO | WO 2008/021315 A2 | 2/2008 |

OTHER PUBLICATIONS

Notification of Transmittal of the International Search Report and the Written Opinion of the International Searching Authority, or the Declaration for International Application No. PCT/US07/17912 (Feb. 27, 2008).

(Continued)

*Primary Examiner* — Parth Patel
*Assistant Examiner* — Kai Chang
(74) *Attorney, Agent, or Firm* — Jenkins, Wilson, Taylor & Hunt, P.A.

(57) ABSTRACT

Methods, systems, and computer program products for hairpin condition elimination in a telecommunications network are disclosed. A method is disclosed herein for eliminating a hairpin condition at a network node. According to one method, a first and second call leg, each using packet processing resources in a bearer node, are identified; if the first and second call legs are in a hairpin condition, the first and second call legs are connected together in the bearer node in a manner that bypasses and releases packet processing resources.

25 Claims, 6 Drawing Sheets

(51) Int. Cl.
*H04M 3/54* (2006.01)
*H04M 15/00* (2006.01)
*H04L 12/66* (2006.01)

(52) U.S. Cl.
CPC .............. *H04L65/80* (2013.01); *H04M 7/127* (2013.01); *H04L 12/66* (2013.01); *H04L 65/102* (2013.01); *H04L 65/1006* (2013.01); *H04L 65/605* (2013.01); *H04M 3/54* (2013.01); *H04M 7/125* (2013.01); *H04M 15/56* (2013.01)

(56) References Cited

U.S. PATENT DOCUMENTS

| | | | | |
|---|---|---|---|---|
| 7,009,962 | B1* | 3/2006 | Chung et al. | 370/356 |
| 7,046,683 | B1* | 5/2006 | Zhao | 370/401 |
| 2002/0141395 | A1* | 10/2002 | Chang | 370/355 |
| 2003/0105804 | A1 | 6/2003 | Turner | |
| 2003/0110292 | A1* | 6/2003 | Takeda et al. | 709/245 |
| 2003/0161460 | A1* | 8/2003 | Dammrose | 379/229 |
| 2004/0190498 | A1* | 9/2004 | Kallio | H04M 7/128 370/352 |
| 2004/0264455 | A1 | 12/2004 | Tao | |
| 2005/0143088 | A1* | 6/2005 | Hirsbrunner et al. | 455/455 |
| 2006/0142010 | A1 | 6/2006 | Tom | |
| 2006/0146792 | A1 | 7/2006 | Ramachandran et al. | |
| 2006/0153205 | A1* | 7/2006 | Belling et al. | 370/401 |
| 2007/0070948 | A1* | 3/2007 | Kezys | H04L 12/6418 370/331 |
| 2007/0070980 | A1* | 3/2007 | Phelps et al. | 370/352 |
| 2007/0070982 | A1 | 3/2007 | Croak | |
| 2007/0140223 | A1* | 6/2007 | Bhatia et al. | 370/352 |
| 2007/0286158 | A1* | 12/2007 | Cook | 370/352 |
| 2008/0031129 | A1* | 2/2008 | Arseneault et al. | 370/218 |
| 2008/0037533 | A1 | 2/2008 | Wah et al. | |

OTHER PUBLICATIONS

Official Action for U.S. Appl. No. 11/544,455 (Jul. 19, 2010).
Final Official Action for U.S. Appl. No. 11/544,455 (Nov. 27, 2009).
Official Action for U.S. Appl. No. 11/544,455 (Mar. 5, 2009).
Notification of Transmittal of the International Search Report and the Written Opinion of the International Searching Authority, or the Declaration for International Application No. PCT/US07/17911 (Feb. 27, 2008).
"Session Initiation Procotol (SIP Tutorial: SIP to ISDN Q.931 Call Flow (Brief))," EventHelix, http://www.EventHelix.com/EventStudio (Downloaded from the Internet on Jun. 10, 2005).
"Session Initiation Protocol (SIP Tutorial: SIP to PSTN Call Flow)," EventHelix, http://www.EventHelix.com/EventStudio (Downloaded from the Internet on Jun. 10, 2005).
Roach, "Session Initiation Protocol (SIP)—Specific Event Notification," Network Working Group, RFC 3265 (Jun. 2002).
Hanmer, "Call Processing," Lucent Technologies, pp. 1-11 (Jun. 28, 2001).
Handley et al., "SDP: Session Description Protocol," Network Working Group (Jul. 2006).
Commonly-assigned, co-pending U.S. Appl. No. 11/544,455 for "Methods, Systems, and Computer Program Products for Associating Independent Legs of a Call in a Telecommunications Network," (Unpublished, filed Oct. 6, 2006).
Groves et al., "Gateway Control Protocol Version 1," Network Working Group (Jun. 2003).
Rosenberg et al., "SIP: Session Initiation Protocol," Network Working Group (Jun. 2002).
First Office Action for Chinese Patent Application No. 200780038011.7 (Sep. 16, 2011).
European Search Report for European Patent Application No. 07836771.1 (Dec. 27, 2011).
Extended European Search Report for European Patent Application No. 07836770.3 (Feb. 5, 2014).

* cited by examiner

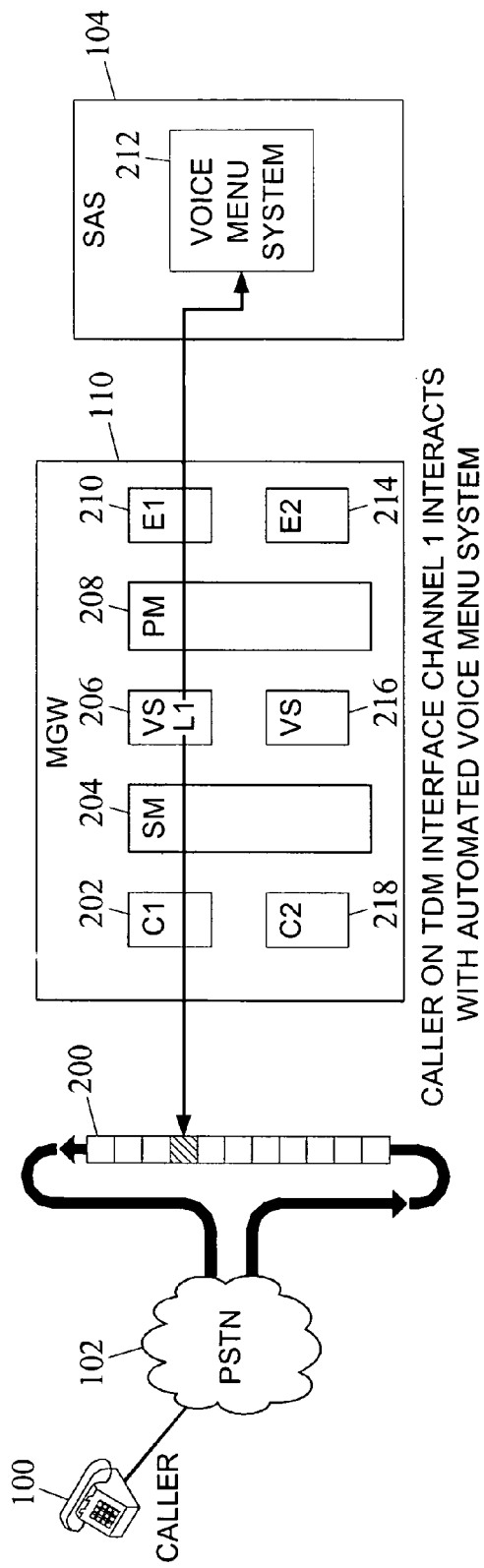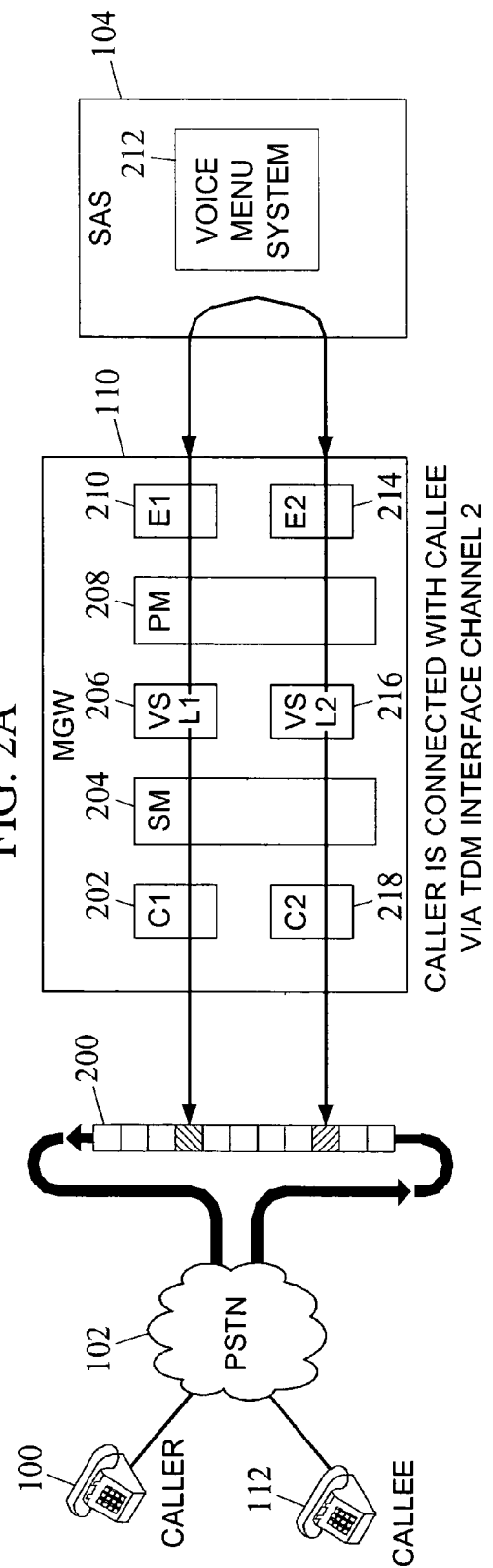

CONNECTION TO SAS IS DROPPED, NODE HAIRPIN IS CREATED AT MGW

NETWORK HAIRPIN

METHODS, SYSTEMS, AND COMPUTER PROGRAM PRODUCTS FOR HAIRPIN CONDITION ELIMINATION IN A TELECOMMUNICATIONS NETWORK

RELATED APPLICATIONS

This application claims the benefit of a U.S. Provisional Patent Application Ser. No. 60/837,595, filed Aug. 11, 2006; the disclosure of which is incorporated herein by reference in its entirety.

TECHNICAL FIELD

The subject matter described herein relates to methods, systems, and computer program products for operation of a telecommunications network. More particularly, the subject matter described herein relates to methods, systems, and computer program products for hairpin condition elimination in a telecommunications network.

BACKGROUND

As telecommunications networks have evolved from being circuit-based to using a packet-based architecture, the concept of a call has changed from a continuous circuit between point A and point B to packets of digitized voice data traveling across a network, using any path available between point A and point B. This concept has been extended to send any type of data, not just digitized voice data, across the telecommunications network, resulting in modern converged networks which allow telecommunications service providers to offer multimedia streaming, web-browsing, and other data-oriented services in addition to traditional telephone service to their customers.

Typical converged networks, however, are not purely packet-based, but are an amalgam of various types of networks, including public switched telephone networks (PSTN), mobile networks, wi-fi networks, and the Internet. Usually, some form of gateway devices are required to provide an interface between the PSTN components and the packet-based components of a converged network and to convert data from one format and protocol into another. For example, PSTN networks use time division multiplexing (TDM), in which the caller's voice is digitized and assigned to a time slot in a frame of data traveling between nodes in the PSTN network, while packet networks use transmission control protocol (TCP) or user-datagram protocol (UDP) to transport packets of data such as digitized voice. Also, in PSTN networks, the bearer channel, which carries voice or data traffic, and the signaling channel, which is used by nodes in the PSTN network to negotiate the route of the bearer channel through the network, typically use physically separate networks. In contrast, while packet-based networks may maintain the concept of distinct signaling and bearer messages, both types of messages typically travel along the same physical network. Therefore, converged networks typically require two distinct types of gateway devices or gateway functions to connect the PSTN and packet-based networks: one for the bearer channel and another for the signaling channel.

The bearer channel interface between traditional PSTN networks and packet-based networks, such as an Internet protocol multimedia subsystem (IMS) network, may be provided by a media gateway (MGW). The MGW may convert data between TDM format and packet format. A physical interface on the MGW may be referred to as a termination point. The signaling channel interface between traditional PSTN networks and packet-based networks may be provided by a media gateway controller (MGC). The MGC may convert between signaling system #7 (SS7) used by PSTNs and session initiation protocol (SIP) used by IMS and other packet-based networks. The MGC typically controls one or more media gateways. The combination of a MGC and one or more MGWs used for voice over Internet protocol (VoIP) is commonly called a softswitch.

In packet-based communication, there is no tight correlation between the bearer path (the path taken by the call) and the signaling path (the path used for communicating between nodes in a network in order to properly route the call packets from source to destination). Nor is there a requirement that the bearer path and signaling path be created together and dismantled together; a signaling path may stay up for a leg of a call while the media path of the leg of the call is taken down. For example, someone calling an automated reservation system, such as those used for booking airline flight reservations, might connect first to an automated voice menu program running on a server in one location, then connect to a human operator in another location. In such a situation, the signaling path to the voice menu program server may continue to operate (to exert application level call control and other functionality such as billing, for example) even though the bearer path to the voice menu program server has been dismantled—e.g., when the caller is switched from talking to the voice menu program to talking with a human operator. One benefit of this arrangement is that the voice menu program is now available for use by the next person who calls the airline flight reservation number. Another benefit of the use of packet-based communication is that the caller may be transparently rerouted from the voice menu server to a human operator without the need for the caller to hang up from the menu server and dial again to reach the human operator. Other benefits of packet-based communication include the ability to add additional callees (e.g., conference calling, three-way calling, etc.), and the ability to associate other data with the call, such as caller ID.

In contrast to circuit-based communication, where a single logical end-to-end circuit is dedicated to carrying the call, packet-based communication has adopted a generic call control model, referred to as a "half-call" model, in which a call is conceptually divided into two half-calls: the originating (ingress) portion, corresponding to the caller's connection from the PSTN to the packet network, and the terminating (egress) portion, corresponding to the callee's connection from the packet network to the PSTN.

As used herein, the term "call leg" refers to a bidirectional bearer path through a network processing node. A call leg is roughly analogous to a half-call. As used herein, the term call leg is not analogous to a SIP dialog; a SIP dialog describes a logical connection between two endpoints of a path, while a call leg describes a data path through a network processing node such as a media gateway.

As used herein, the term "context" refers to the logical association of two or more terminal points with each other to indicate the physical interfaces and resources a particular call is occupying in a network processing node. For example, a call context may describe a call, through a MGW, that uses one of the MGW's TDM channel interfaces to connect to a PSTN network, and uses one of the MGW's Ethernet interfaces to connect to a packet interface. The call context maintains information about which TDM channel and/or Ethernet interfaces are used for a particular call.

As used herein, the term "call instance" refers to an object created in a network processing node, such as a media gateway controller, to represent a call. A call instance may maintain information about the call such as the call's context and the IP addresses and ports of the ingress and egress media gateways through which the call travels. A call instance may keep track of the source, or near end, address of the bearer path, and the destination, or far end, address of the bearer path. Thus, a call instance may maintain more information than is associated with a traditional half-call model.

One consequence of using the half-call model is that due to the loose correlation between the two legs of a call, the telecommunications network control system may be unable to identify and rectify situations where network resources are inefficiently used. A non-trivial example is the so-called "hairpin" situation—a loop condition where a connection originates and terminates at the same node. A hairpin may not be created directly, but may be an artifact resulting from a process of several steps, as described in the example below.

FIG. 1A illustrates the first step in a hairpin scenario, using the example of a caller making a flight reservation described above. Referring to FIG. 1A, caller 100 on a public switched telephone network PSTN 102 dials the telephone number of an airline flight reservation system, an automated voice menu system which is provided by a SIP application server SAS 104 within packet network 106. Based upon the telephone number, SS7 signaling messages may be sent through PSTN 102 to a media gateway controller MGC 108, which may use media gateway control protocol (MGCP) messages to control a media gateway MGW 110, directing it to establish a bearer path between caller 100 and MGW 110. MGC 108 may establish call leg L1 through MGW 110, and send a SIP INVITE request to SAS 104 to create a bearer path from MGW 110 to SAS 104 through packet network 106. Once call leg L1 connects these two bearer paths, caller 100 may use the voice menu system on SAS 104.

FIG. 1B illustrates the next step in the hairpin scenario. If for example caller 100 selects a voice menu option to transfer his call to another person, callee 112, SAS 104 will initiate the connection from SAS 104 to callee 112, which includes sending a request to MGC 108 to create a bearer path from SAS 104 through packet network 106 to MGW 110. MGC 108 may establish call leg L2 through MGW 110 and create a bearer path from MGW 110 through PSTN 102 to callee 112. In this way, a loop is created from MGW 110 to SAS 104 and back again, through call legs L1 and L2.

FIG. 1C illustrates the final step in the hairpin scenario. Because SAS 104 is no longer needed in the path from caller 100 to callee 112, it will issue a SIP RE-INVITE command to callee 112, requesting callee 112 to connect directly to caller 100, instead of to SAS 104. As a result, MGC 108 will instruct MGW 110 to connect call leg L1 to call leg L2, bypassing SAS 104 and thereby creating a hairpin condition at MGW 110. This type of hairpin, created as a result of a connection to and later disconnection from a node, is referred to as a node hairpin. Although functional, the hairpin so created is an inefficient use of network resources. This is shown in more detail in FIG. 2A through FIG. 2C.

FIG. 2A illustrates call leg L1 shown in FIG. 1A in more detail. Referring to FIG. 2A, digitized voice data from caller 100 is part of TDM data 200 transported across PSTN 102 to MGW 110 to be processed. Call leg L1 is the data path through MGW 110. Call data from TDM channel interface C1 202 is routed through a switching matrix 204 to an available voice server 206. The function of voice server 206 is to convert data between TDM format and packet format. Thus, it is common for voice server 206 to be a digital signal processor (DSP) or other, typically expensive, hardware. Packet data produced by voice server 206 is sent to a packet matrix 208, which routes the packet data to an available Ethernet interface E1 210. The call is routed through E1 210 and across packet network 106 (not shown) to SAS 104, allowing caller 100 to talk to the voice menu system 212.

FIG. 2B illustrates the call legs L1 and L2 shown in FIG. 1B in more detail. Referring to FIG. 2B, caller 100 has for example selected a voice menu option to connect to another party, callee 112. In response, SAS 104 has connected caller 100 with callee 112 by making a request to MGC 108 to establish a new call leg L2 through MGW 110 via the data path shown through Ethernet interface E2 214, voice server 216 and TDM channel interface C2 218.

A MGW typically has multiple physical interfaces through which bearer traffic may flow. In FIG. 2A, four termination points are shown: the TDM channel interfaces C1 202 and C2 218, and the Ethernet interfaces E1 210 and E2 214. In the example shown in FIG. 2B, a first call context will associate terminal point C1 202 with terminal point E1 210, and a second call context will associate terminal point C2 218 with terminal point E2 214.

FIG. 2C illustrates the condition shown in FIG. 1C in more detail. Referring to FIG. 2C, SAS 104 has issued a SIP RE-INVITE command to callee 112, and as a result MGC 108 has instructed MGW 110 to create a logical connection between caller 100 and callee 112, through call legs L1 and L2. Note that the first and second contexts as described above for FIG. 2B did not change and still exist in FIG. 2C. In FIG. 2C it can be seen that this hairpin condition consumes significant resources within MGW 110, including two TDM channel interfaces, two voice servers, two Ethernet interfaces, and internal switching channels within the switching matrix and packet matrix modules. If, from this point on, caller 100 has no need to access any service or feature within packet network 106, there may be no need to route the call through the DSP or packet resources of MGW 110. FIG. 3 illustrates a second type of hairpin condition, referred to as a network hairpin, which is created when a call enters the packet network through a media gateway, is routed through the packet network, and exits the packet network through the same media gateway by which it entered. Referring to FIG. 3, caller 100 on PSTN 102 calls callee 112, also on PSTN 102; the call enters packet network 106 through call leg L1 in MGW 110; is routed through packet network 106, eventually arriving at the same gateway MGW 110; exits packet network 106 through call leg L2 in MGW 110; and reenters PSTN 102. As with a node hairpin, this network hairpin also consumes significant Packet processing resources within a media gateway.

Currently there are no means by which an entity in the network can recognize that the first and second legs of a call are in a hairpin condition so that it may free the packet and DSP resources unnecessarily in use by the two call legs and make the released resources available for the next call.

Accordingly, in light of these disadvantages associated with the occurrence of hairpin conditions within a converged network, there exists a need for a way to detect and eliminate a hairpin condition in a telecommunications network.

SUMMARY

According to one aspect, the subject matter described herein includes a method for elimination of a hairpin condition in a telecommunications network, by determining whether two call legs at a media gateway are in a hairpin configuration, and if so, then connecting the call legs together in a manner which bypasses packet processing resources within the media gateway so that these packet processing resources may be, and subsequently are, released.

According to another aspect, the subject matter described herein includes a system for eliminating a hairpin condition in a telecommunications network. The system includes a bearer node for interfacing between a packet network and a circuit-switched network, the bearer node including multiple network interfaces, TDM processing resources and packet processing resources for processing media data received over the circuit-switched network and the packet network, and at least one switching matrix for connecting the network interfaces to the TDM and packet processing resources. The system further includes a hairpin detection function that determines whether two call legs are in a hairpin condition, and if so, then instructs the bearer node to internally bridge the call legs in a manner that bypasses and releases the packet processing resources.

The subject matter described herein for managing an IMS network may be implemented in software in combination with hardware and/or firmware. As such, the terms "function" or "module" as used herein refer to software in combination with hardware and/or firmware for implementing the feature being described. In one exemplary implementation, the subject matter described herein may be implemented using a computer program product comprising computer executable instructions embodied in a non-transitory computer readable medium. Exemplary computer readable media suitable for implementing the subject matter described herein include disk memory devices, chip memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 2A is a block diagram illustrating the network shown in FIG. 1A, showing the data paths through a media gateway controller in detail;

FIG. 2B is a block diagram illustrating the network shown in FIG. 1B, showing the data paths through a media gateway controller in detail;

DETAILED DESCRIPTION

In accordance with the subject matter described herein, methods, systems, and computer program products are provided for detection and elimination of a hairpin condition in a converged network.

Figure 3:
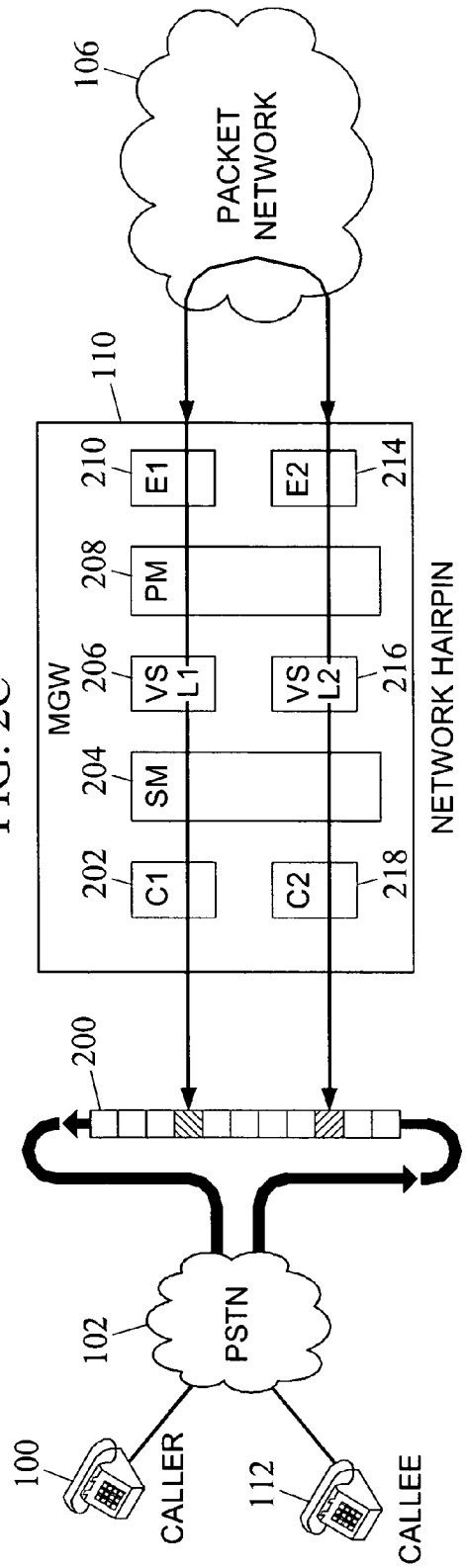
FIG. 3 is a block diagram illustrating a network hairpin condition at a media gateway.
Figure 4:
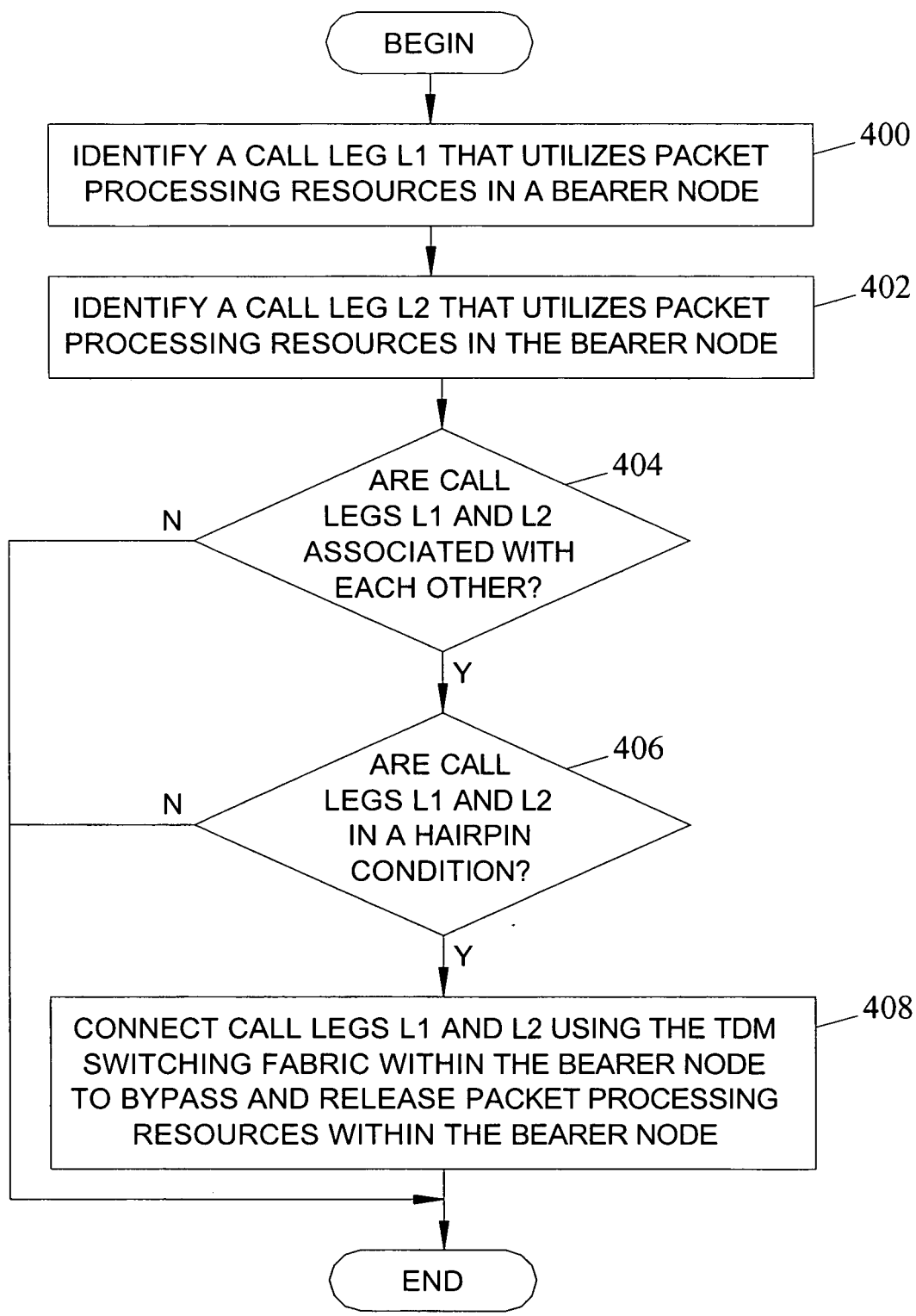
FIG. 4 is a flow chart illustrating an exemplary process for elimination of a hairpin condition in a converged network in accordance with an embodiment of the subject matter described herein.

FIG. 4 is a flow chart illustrating an exemplary process for detection and elimination of an external hairpin condition in accordance with an embodiment of the subject matter described herein. Referring to FIG. 4, in step 400, call leg L1 is identified as a leg that utilizes packet processing resources in a bearer node, such as a media gateway. The node and network hairpins described above occur in situations where a call originates from a PSTN, travels through a packet network, and terminates in a PSTN. A call which crosses the interface between a PSTN and a packet network must use packet processing resources; thus, call legs that utilize packet processing resources (or other resources necessary to convert from TDM format to packet format) may be targeted for potential hairpin elimination. For example, referring to FIG. 3, any call utilizing a voice server such as voice server 206 or voice server 216, an Ethernet interface such as E1 210 or E2 214, and the packet matrix 208 is a candidate for consideration for the purpose of hairpin detection and elimination. In step 402, call leg L2 is similarly identified as a candidatefor hairpin detection and elimination.

In some embodiments, a determination is made whether call legs L1 and L2 are associated with each other before attempting to detect a hairpin condition. This determination is hereinafter referred to as "call association". This may be done to reduce the processing overhead associated with hairpin detection by restricting the application of the hairpin detection function to only those call legs that are associated with each other and thus likely to be in a hairpin condition. In step 404, a determination is made whether call legs L1 and L2 are associated, and if not, the process may end.

Figure 1A:
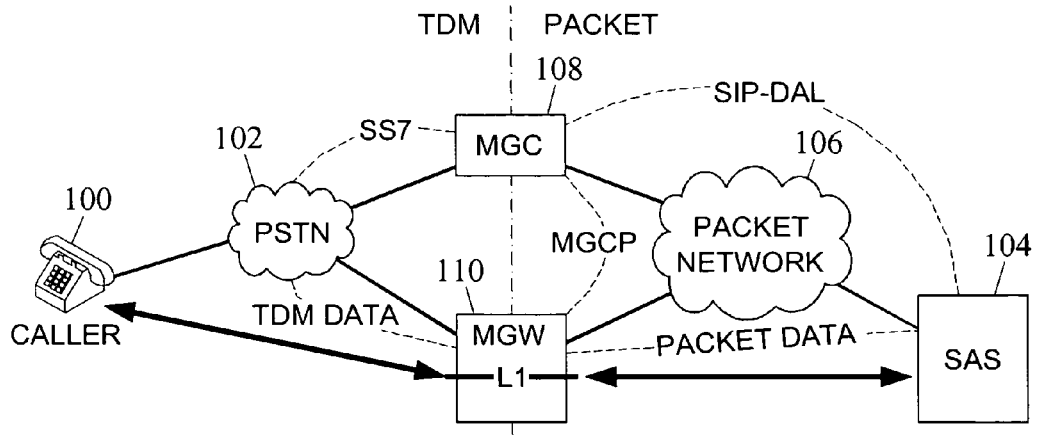
FIG. 1A is a block diagram illustrating an exemplary converged network in which a caller is communicating with a SIP application server.
Figure 1B:
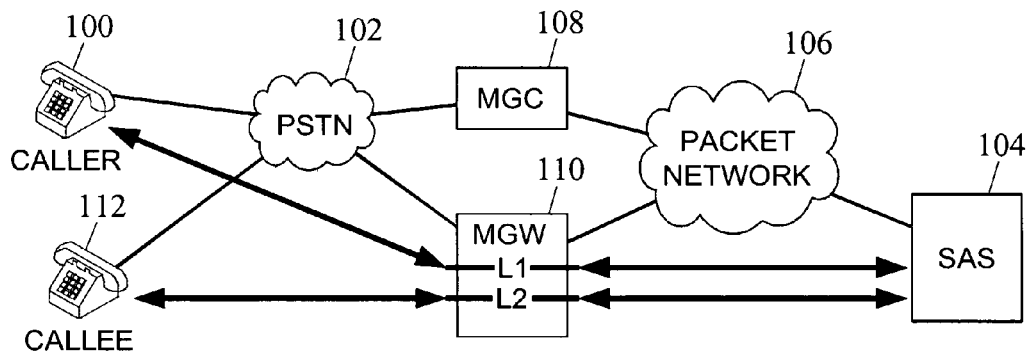
FIG. 1B is a block diagram illustrating an exemplary converged network in which a SIP application server has redirected a caller to a callee.
Figure 1C:
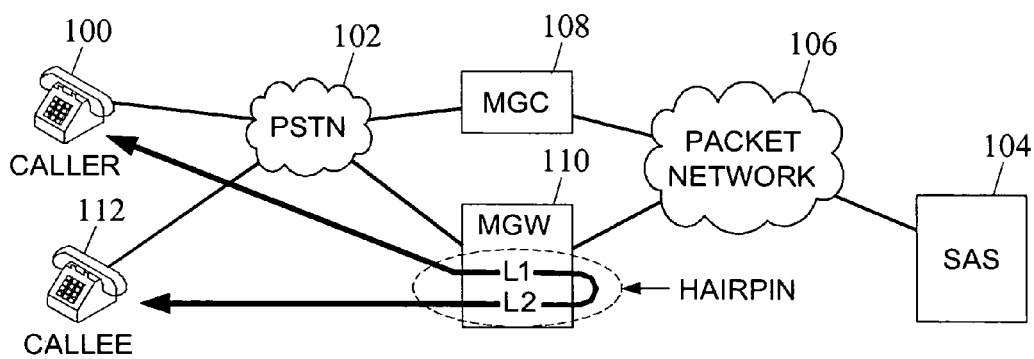
FIG. 1C is a block diagram illustrating an exemplary converged network in which a SIP application server has dismantled the bearer paths between itself and a media gateway controller, creating a hairpin condition at the media gateway controller.
Figure 2C:
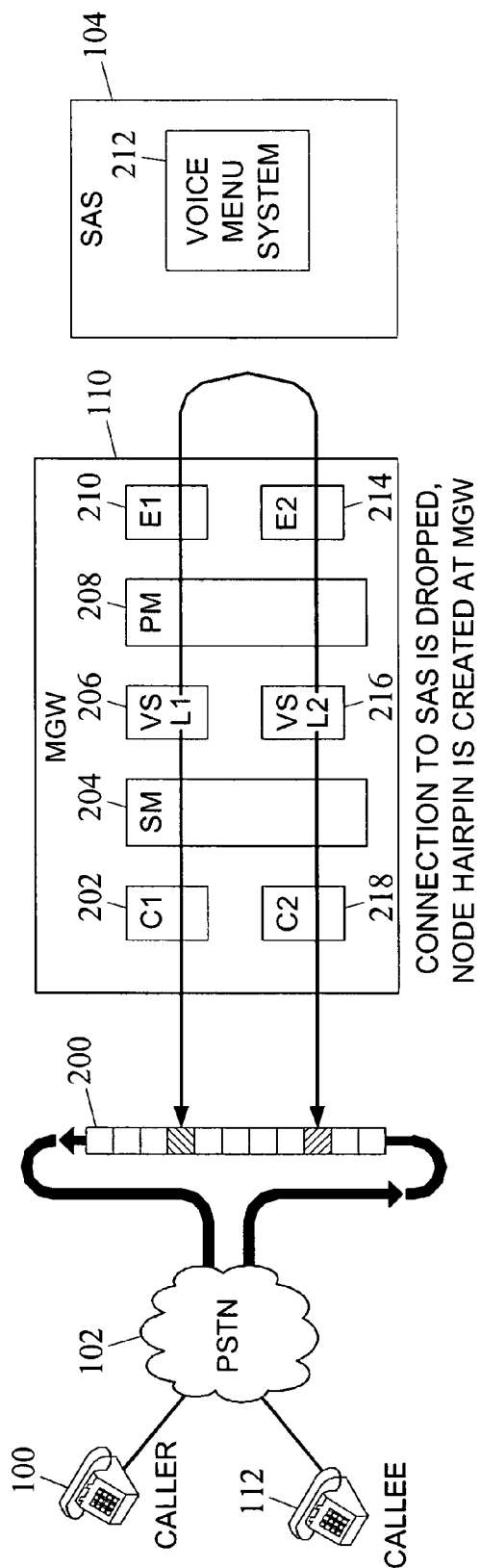
FIG. 2C is a block diagram illustrating the network shown in FIG. 1C, showing the data paths through a media gateway controller in detail and illustrating a node hairpin condition.

Conceptually, two call legs may be associated if they are part of the same call between a caller and one or more callees. Again referring to FIG. 3, caller 100 is connected to callee 112 through call legs L1 and L2. These two call legs may be associated with each other, for example, if they are half-calls of two different bearer paths that carry the same call, as in FIG. 1B. Two call legs may also be associated, for example, if they are half-calls of one bearer path, as in FIG. 1C. Referring to FIG. 1C, since call legs L1 and L2 are half-calls of the same call, they may be associated with each other.

Referring to FIG. 4, step 404, call association may be made according to the methods, systems, and computer program products for making call association across elements of a telecommunications network as described in a commonly assigned patent application entitled, Methods, Systems, and Computer Program Products for Associating Independent Call Legs, filed on even date herewith, the disclosure of which is incorporated herein by reference in its entirety. Briefly, call association may be made by having a first signaling entity insert a call association value in a first SIP signaling message sent to a second signaling entity to set up a bearer path between two bearer nodes. The second signaling entity may determine that a bearer path, which is related to the first bearer path, is needed. The second signaling entity may copy the call association value from the first signaling message into the call association field of a second signaling message and may send the second signaling message to the first signaling entity to set up the second bearer path between the same two bearer nodes. The first signaling entity may use the call association value received in the second signaling message to associate the first call leg and the second call leg with each other, thus recognizing that the two bearer paths are associated with each other. Call association may also be made by having a signaling entity insert a call association value in a SIP signaling message which, after being routed through the network, arrives back to the same signaling entity. In this scenario, the signaling entity may use the call association value in the signaling message received to determine that the signaling message was originally generated by the first signaling entity itself, and may then associate the originating and terminating call legs with each other, thus recognizing that the two call legs are separate ends of the same bearer path.

Call association may be performed by a MGC, a MGW, or other node in the network. The details of associating two call legs at a network element such as a MGC may depend on the specific architecture of the MGC in question. According to one embodiment, a global call manager may keep track of all live calls, perform a search using a call association identifier (CAID), a combination of bearer node IP address and port number, or other appropriate key or index, and make an association between call instances that have the same key or index. According to another embodiment, independent call instances may communicate with each other to make associations between the two call legs. According to yet another embodiment, the source and destination address associated with a pair of call legs may be compared to determine whether or not the call legs are associated with each other. Although employing a call association step may greatly improve efficiency of the hairpin detection process, it is not mandatory.

In step 406, it is determined whether the call legs are in a hairpin condition; if not, the process ends. Determination that a pair of associated call legs is in a hairpin condition may be performed by a variety of techniques. For example, either the MGC or the MGW may identify a hairpin condition by comparing the origination and termination addresses for two or more associated call legs: if the call legs connect the same two nodes, and both ends of the bearer path associated with each call leg connect to the same node, a hairpin condition may be identified. In a MGC, the origination and termination addresses may be determined from the session description protocol (SDP) information of the SIP messages used to create the call legs. In a MGW, the origination and termination addresses may be determined from information, typically sent by the MGC to the MGW and which the MGW stores with each call context, such as the near-end and far-end addresses of the bearer path. Either the MGC or the MGW may identify a hairpin condition by determining that two half-calls of the same call use the same MGW.

Figure 6:
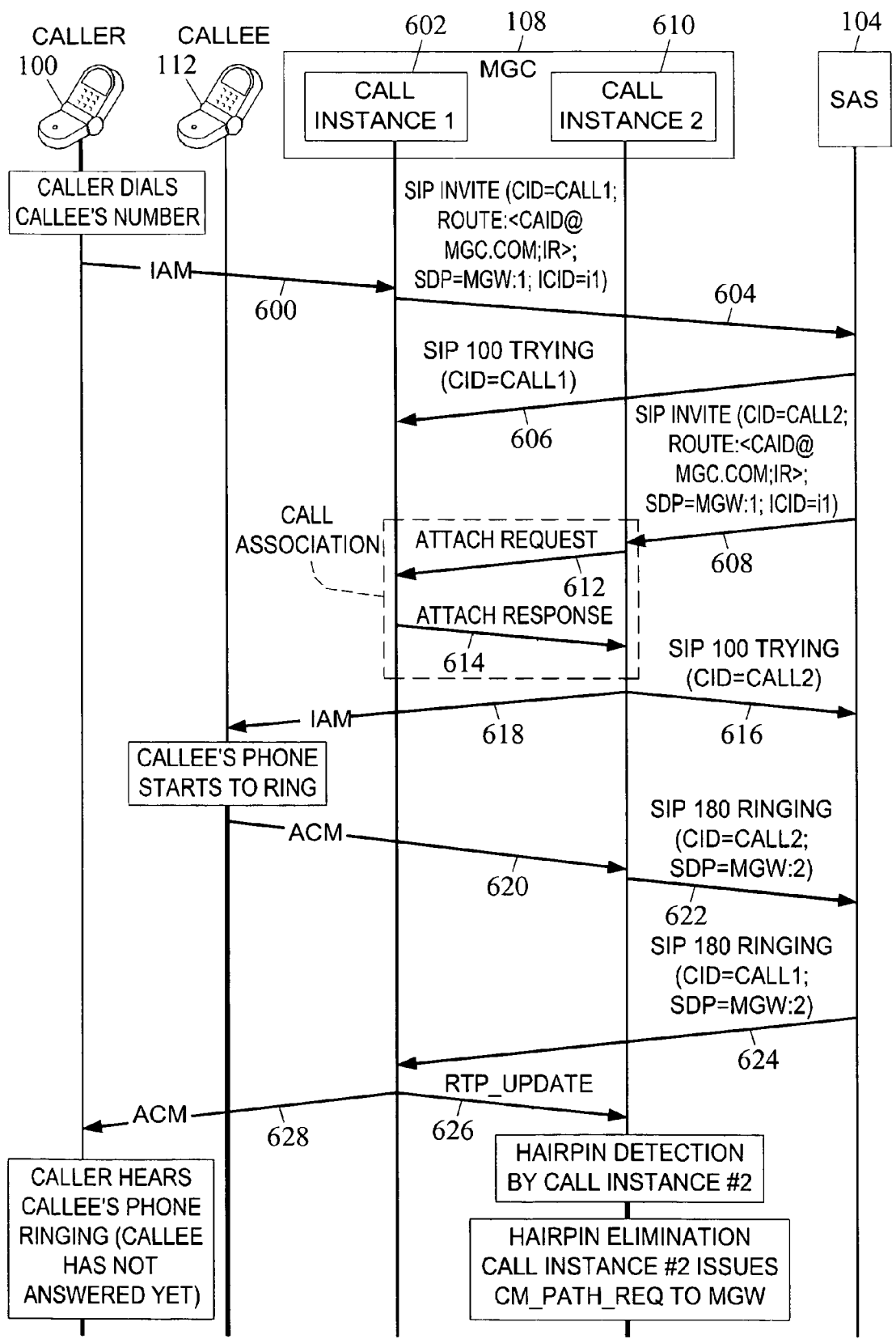
FIG. 6 is a message flow diagram illustrating signaling messages exchanged during performance of the hairpin elimination process in accordance with an embodiment of the subject matter described herein.

In step 408, the hairpin condition is eliminated by directing the media gateway to shunt the TDM channel data of the ingress half-call to the TDM channel data of the egress half-call through the TDM switching fabric, thus creating a loopback from PSTN to PSTN and bypassing the packet processing resources, including voice servers, packet switching matrix, and Ethernet interfaces, formerly occupied by call legs L1 and L2. This may be accomplished, for example, through the issuance of media gateway control protocol messages from the MGC to the MGW. Example message protocols include MGCP, MeGaCo, and H.248. A detailed example of the use of such messages is shown in FIG. 6, and described in this document, below. After the hairpin is eliminated, the MGW reports released gateway resources to the MGC.

Figure 5:
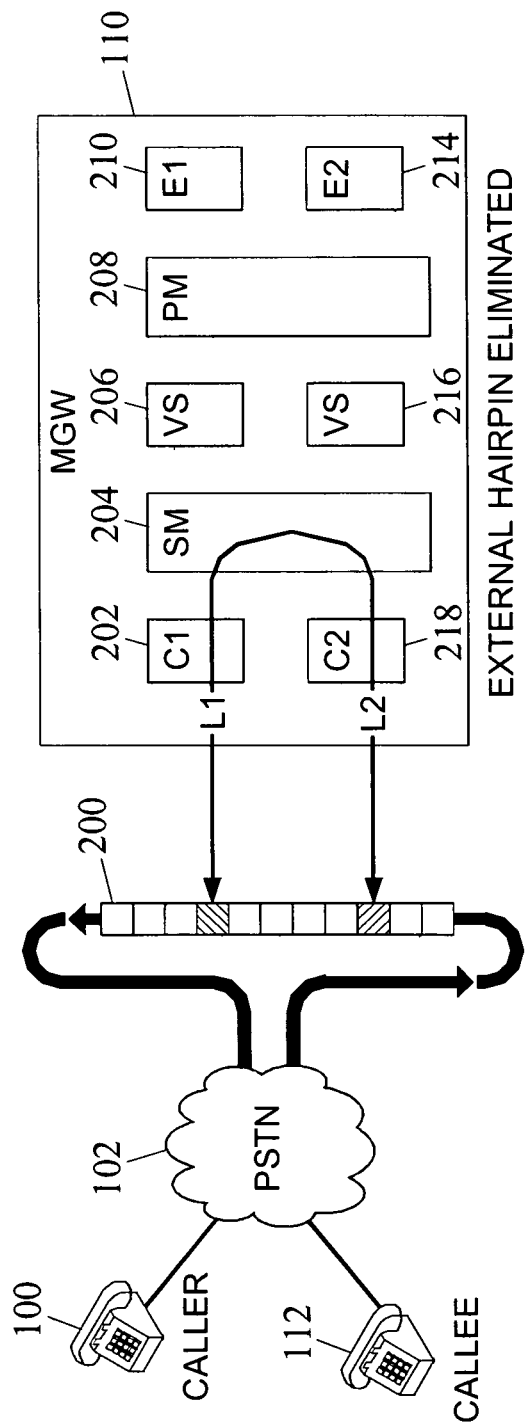
FIG. 5 is a block diagram illustrating the result of elimination of an external hairpin condition at a media gateway.

FIG. 5 is a block diagram illustrating the result of detection and elimination of an external hairpin condition in accordance with an embodiment of the subject matter described herein. Referring to FIG. 5, call leg L1 is internally connected to call leg L2 via switching matrix 204 within MGW 110. As a result, formerly occupied packet processing resources voice server 206, voice server 216, Ethernet interfaces E1 210 and E2 214, and parts of packet matrix 208 are released. These freed packet processing resources are available for use by another call. Elimination of unnecessary utilization of expensive resources such as DSPs has two distinct benefits: it may allow greater resource utilization within a media gateway, and it may reduce the number of DSPs required in a media gateway, both of which may reduce cost of deployment.

FIG. 6 is a message flow diagram illustrating an exemplary process for exchanging messages between call instances as part of the hairpin elimination process in accordance with an embodiment of the subject matter described herein. In this embodiment, a call processing instance is created for each call leg. It will be understood, however, that call legs may be represented by other structures, objects, or data abstractions, and that this example is for the purpose of illustration only, and not for the purpose of limitation.

In this example, SAS 104 operates as a simple phone menu interface that does not send RTP data to a caller, and thus does not need to establish a bearer path between itself and MGW 110. Referring to FIG. 6, MGC 108 receives a SETUP message 600 from caller 100 and creates call instance 1 602. Call instance 1 602 is assigned ingress port 1 on a MGW (MGW:1), and sends to SAS 104 a SIP INVITE message 604. This message may include a loose routing header containing call association data, and a session description protocol (SDP) payload indicating that the bearer path should connect to MGW:1. SAS 104 sends to call instance 1 602 a SIP TRYING message 606 to indicate that it is now attempting to contact caller 100. Call instance 1 602 now knows the source address of its bearer path (i.e., MGW:1) but it does not yet know the destination address of its bearer path.

SAS 104 next sends to MGC 108 a SIP INVITE message 608 with a loose routing header containing the call association data and SDP payload that was copied from SIP INVITE message 604, and in response, MGC 108 creates a second call instance 2 610. From the SDP payload, call instance 2 610 determines the destination address of its bearer path (i.e., MGW:1). Call instance 2 610 is assigned egress port 2 on the MGW (MGW:2), which is the source address of its bearer path. Call instance 2 610 now knows both the source and destination addresses of its bearer path (i.e. MGW:2 and MGW:1, respectively).

According to one embodiment, call association may now be performed by a global call manager, which tracks all live calls. In this embodiment, all live calls are registered in a hash-table based register, using media gateway IP address and UDP port as a hash key. Referring to FIG. 6, the media gateway IP address and UDP port defined in the SDP payload of SIP INVITE message 604 matches the media gateway IP address and UDP port defined in the SDP payload of SIP INVITE message 608: both are equal to "mgw:1". Call instance 2 610 may formally associate itself with call instance 1 602 by sending to call instance 1 602 an ATTACH REQUEST message 612, which informs call instance 1 602 that call instance 2 610 intends to create a bearer path from MGW:2 to MGW1. Call instance 1 602 sends back to call instance 2 610 a ATTACH RESPONSE message 614, which informs call instance 2 610 that call instance 1 602 intends to create a bearer path from MGW:1, but the destination address is not yet known. Call instance 2 610 may act as a master and call instance 1 602 may act as a slave in a master/slave relationship.

According to another embodiment, call association may now be performed by the call instances. In this embodiment, because call instance 2 610 was created in response to an incoming SIP INVITE message, it uses the call association data from the loose routing header to look for other call instances with the same call association data value, and finds call instance 1 602. Call instance 2 610 may formally associate itself with call instance 1 602 using ATTACH REQUEST and ATTACH RESPONSE messages as described above.

At this point, ingress call instance 1 602 and egress call instance 2 610 are associated with each other, but no bearer path has been established yet. Call instance 2 610 then sends SIP TRYING message 616 to SAS 104, and sends SETUP message 618 to the PSTN, which causes callee 112 phone to ring. An ALERT message 620 is sent to call instance 2 610, which causes call instance 2 610 to send a SIP RINGING message 622 to SAS 104, which relays the message 624 to call instance 1 602. From the SDP payload, call instance 1 602 determines the destination address of its bearer path (i.e., MGW:2). Call instance 1 602 now knows both the source and destination addresses of its bearer path (i.e., MGW:1 and MGW:2, respectively.) In response to the SIP RINGING messages, a bearer path is established between MGW:1 and MGW:2. In one embodiment, as a slave in a master/slave relationship, call instance 1 602 may alert its master, call instance 2 610, anytime call instance 1 602 changes its bearer path. Because the destination address of the bearer path of call instance 1 602 was changed from "unknown" to MGW:2, call instance 1 602 sends an internal message RTP_update 626 to call instance 2 610 indicating this change.

According to one embodiment, hairpin detection may be performed by MGC 108. Call instance 2 610 now has enough information to begin hairpin detection, and it examines the forward and backward packet data path of all call instances associated with itself in order to determine whether or not an external hairpin condition is present. The hairpin detection function may be triggered by receipt of an RTP_update message or other appropriate event. In the example shown in FIG. 6, call instance 2 610 searches the forward and backward packet data paths of call instance 1 602 and determines that both call legs have the same bearer path, between MGW:1 and MGW:2. Call instance 2 610, recognizing this as a hairpin condition, may send a command, such as a CM_PATH_REQ message (not shown), to MGW 110 to initiate hairpin elimination. In response to receipt of the command to initiate hairpin elimination, MGW 110 may eliminate the hairpin between call instance 1 602 and call instance 2 610 by connecting the TDM data portions of the two call legs through its TDM switching matrix, releasing the packet-processing resources formerly used by the two call legs, and notifying MGC 108 of the change in data path and of the availability of the packet-processing resources (the notify messages are not shown). Meanwhile, call instance 1 602 sends an ALERT message 628 to caller 100.

According to another embodiment, hairpin detection may be performed by MGW 110. This may be desirable when some limitation of MGC 108 prevents it from being able to detect a hairpin condition, for example. MGW 110 may maintain context information for all calls routed through the gateway, including the IP address and port for the near-end (source) address and far-end (destination) address of the bearer path of each call leg. Hairpin detection by MGW 110 may be triggered whenever MGW 110 receives a command from MGC 108 to cross-connect two call legs, for example, in which case MGW 110 may determine that a hairpin condition exists by comparing the near-end address of call leg 1 with the far-end address of call leg 2, vice-versa, or both. Referring to FIG. 6, call leg 1 has a near-end address of MGW:1 and a far-end address of MGW:2, and call leg 2 has a near-end address of MGW:2 and a far-end address of MGW:1. Upon receipt of a command from MGC 108 to cross-connect call legs 1 and 2, MGW 110 may determine that call legs 1 and 2 are in a hairpin condition by determining that the near-end address of call leg 1 is the same as the far-end address of call leg 2, and vice versa. Once the hairpin condition is detected, MGW 110 may then take steps eliminate the hairpin condition by connecting the TDM data portions of the call legs through its TDM switching matrix, releasing the packet-processing resources, notifying MGC 108, and so on, as described above. Note that this embodiment does not require call association; that is, it is not necessary to determine whether call legs 1 and 2 were associated with each other.

According to another embodiment, hairpin elimination is accomplished via MeGaCo MOD commands issued by MGC 108 to MGW 110. Referring to FIG. 3, given that termination points Tc1, Tc2, Te1, and Te2 refer to the physical interfaces for TDM channel C1 202, TDM channel C2 218, Ethernet interface E1 210 and Ethernet interface E2 214, respectively, in FIG. 3 there are two contexts:

Context1 = [TC1,TE1]
Context2 = [TC2,TE2]

The hairpin condition shown in FIG. 3 may be eliminated by executing two MOD commands that direct each termination point to set its destination point as the other termination point:

MOD(TC1, dest=TC2; src=TC1)
MOD(TC2, dest=TC1; src=TC2)

resulting in a single context,

Context1 = [TC1,TC2]

representing the eliminated hairpin condition as shown in FIG. 5.

It will be understood that various details of the invention may be changed without departing from the scope of the invention. Furthermore, the foregoing description is for the purpose of illustration only, and not for the purpose of limitation.

What is claimed is:

1. A method for eliminating a hairpin condition in a telecommunications network, the method comprising:
   (a) identifying a first call leg that utilizes packet processing resources in a bearer node, wherein the bearer node includes a plurality of channel interfaces coupled to a circuit-switched network, a time division multiplexing (TDM) switching matrix coupled to the channel interfaces, and a plurality of voice servers, coupled to the TDM switching matrix, that include digital signal processor (DSP) resources configured to convert data between a TDM format and a packet format for the packet processing resources;
   (b) identifying a second call leg that utilizes the packet processing resources in the bearer node;
   (c) determining whether the first and second call legs are in a hairpin condition, wherein, in the hairpin condition, the first and second call legs join a first user on the circuit-switched network to a second user on the circuit-switched network and the first and second call legs utilize at least some of the DSP resources in addition to the packet processing resources; and
   (d) in response to determining that the first and second call legs are in the hairpin condition, connecting the first and second call legs within the bearer node by shunting the first call leg to the second call leg through the TDM switching matrix, creating a loopback from the circuit-switched network to the circuit-switched network and bypassing both the packet processing resources and the voice servers that include the DSP resources.

2. The method of claim 1 wherein the packet processing resources comprise at least one of a packet switching matrix, and an Ethernet interface.

3. The method of claim 1 wherein identifying the first call leg that uses packet processing resources includes identifying the first call leg based on one of a type of call, a call trunk group, and a service feature.

4. The method of claim 1 wherein determining whether the first and second call legs are in the hairpin condition includes determining whether the first and second call legs are associated with each other.

5. The method of claim 4 wherein determining whether the first and second call legs are associated with each other includes comparing call association values extracted from signaling messages used to establish the first and second call legs.

6. The method of claim 5 wherein the call association values comprise components of session initiation protocol (SIP) loose routing header portions of the signaling messages.

7. The method of claim 4 wherein determining whether the first and second call legs are associated with each other includes comparing source and destination node identifiers extracted from signaling messages used to establish first and second call legs.

8. The method of claim 7 wherein the source and destination node identifiers comprise components of session description protocol (SDP) portions of the signaling messages.

9. The method of claim 7 wherein the source and destination node identifiers comprise source and destination addresses associated with the first and second call legs.

10. The method of claim 9 wherein the source and destination addresses associated with the first and second call legs comprise at least one of SIP addresses, IP addresses, UDP ports, and TCP ports associated with the first and second call legs.

11. The method of claim 4 wherein determining whether the first and second call legs are associated with each other includes maintaining a table of live calls, the table including information associated with the first call leg, accessing the table using information associated with the second call leg, and, associating the first and second call legs with each other based on results of the access.

12. The method of claim 11 wherein the table comprises a hash-table and wherein accessing the table includes accessing the table using at least one of a call association value, a bearer node IP address, a bearer node UDP port, and a bearer node TCP port as a hash key.

13. The method of claim 4 wherein the bearer node is a media gateway (MGW), wherein determining whether the first and second call legs are associated with each other comprises using a media gateway controller (MGC) to determine whether the first and second call legs are associated with each other, and wherein the connecting of the first and second call legs is performed by the MGC through the issuance of one or more media gateway control protocol messages from the MGC to the MGW.

14. The method of claim 1 wherein determining whether the first and second call legs are in the hairpin condition includes comparing source and destination addresses associated with the first and second call legs.

15. The method of claim 14 wherein the source and destination addresses associated with the first and second call legs comprise at least one of SIP addresses, IP addresses, UDP ports, and TCP ports associated with the first and second call legs.

16. The method of claim 13 wherein the one or more media gateway control protocol messages comprise at least one of a media gateway control (MeGaCo) protocol message, an extended gateway control protocol (EGCP) message, and an ITU-T H.248 message.

17. The method of claim 16 wherein the MeGaCo protocol message comprises a MOD command.

18. A system for eliminating a hairpin condition in a telecommunications network, the system comprising:
   (a) a bearer node for interfacing between a packet network and a circuit-switched network, the bearer node including a plurality of channel interfaces coupled to the circuit-switched network, a time division multiplexing (TDM) switching matrix coupled to the channel interfaces, and a plurality of voice servers, coupled to the TDM switching matrix, that include digital signal processor (DSP) resources configured to convert data between a TDM format and a packet format for packet processing resources coupled to the packet network; and
   (b) controller separate from the bearer node, the controller including a hairpin detection function for detecting that two call legs are in a hairpin condition, wherein, in the hairpin condition, the two call legs join a first user on the circuit-switched network to a second user on the circuit-switched network and the two call legs utilize at least some of the DSP resources in addition to the packet processing resources, and in response to detecting that the two call legs are in the hairpin condition, for instructing the bearer node to connect the two call legs by shunting the two call legs through the TDM switching matrix, creating a loopback from the circuit-switched network to the circuit-switched network and bypassing both the packet processing resources and the voice servers that include the DSP resources.

19. The system of claim 18 wherein the packet processing resources comprise at least one of a packet switching matrix, and an Ethernet interface.

20. The system of claim 18 wherein the bearer node comprises a media gateway (MGW), wherein the controller comprises a media gateway controller (MGC), and wherein the MGC instructs the MGW to connect the two call legs through the issuance of one or more media gateway control protocol messages from the MGC to the MGW.

21. The system of claim 18 wherein the hairpin detection function compares call association values extracted from signaling messages used to establish the call legs.

22. The system of claim 18 wherein the call association values comprise components of session initiation protocol (SIP) loose routing header portions of the signaling messages.

23. The system of claim 18 wherein the hairpin detection function compares source and destination node identifiers extracted from signaling messages used to establish the call legs.

24. The system of claim 23 wherein the source and destination node identifiers comprise components of session description protocol (SDP) portions of the signaling messages.

25. A computer program product comprising computer-executable instructions embodied in a non-transitory computer-readable medium for performing steps comprising:

(a) identifying a first call leg that utilizes packet processing resources in a bearer node, wherein the bearer node includes a plurality of channel interfaces coupled to a circuit-switched network, a time division multiplexing (TDM) switching matrix coupled to the channel interfaces, and a plurality of voice servers, coupled to the TDM switching matrix, that include digital signal processor (DSP) resources configured to convert data between a TDM format and a packet format for the packet processing resources;

(b) identifying a second call leg that utilizes packet processing resources in the bearer node;

(c) determining whether the first and second call legs are in a hairpin condition, wherein, in the hairpin condition, the first and second call legs join a first user on the circuit-switched network to a second user on the circuit-switched network and the first and second call legs utilize at least some of the DSP resources in addition to the packet processing resources; and (d) in response to determining that the first and second call legs are in the hairpin condition, connecting the first and second call legs within the bearer node by shunting the first call leg to the second call leg through the TDM switching matrix, creating a loopback from the circuit-switched network to the circuit-switched network and bypassing both the packet processing resources and the voice servers that include the DSP resources.

* * * * *